United States Patent
Lassa et al.

(10) Patent No.: US 9,116,620 B2
(45) Date of Patent: Aug. 25, 2015

(54) CONTROLLER AND METHOD FOR MEMORY ALIASING FOR DIFFERENT FLASH MEMORY TYPES

(75) Inventors: Paul A. Lassa, Cupertino, CA (US); Robert D. Selinger, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 76 days.

(21) Appl. No.: 13/341,443

(22) Filed: Dec. 30, 2011

(65) Prior Publication Data

US 2013/0173846 A1   Jul. 4, 2013

(51) Int. Cl.
*G06F 12/00* (2006.01)
*G06F 3/06* (2006.01)
*G06F 12/10* (2006.01)
*G06F 12/02* (2006.01)

(52) U.S. Cl.
CPC ............ *G06F 3/0607* (2013.01); *G06F 3/0659* (2013.01); *G06F 3/0661* (2013.01); *G06F 3/0685* (2013.01); *G06F 3/0688* (2013.01); *G06F 3/0679* (2013.01); *G06F 12/0246* (2013.01); *G06F 12/1081* (2013.01); *G06F 2212/7208* (2013.01)

(58) Field of Classification Search
CPC  G06F 12/0246; G06F 12/1081; G06F 3/0679
See application file for complete search history.

(56) References Cited

U.S. PATENT DOCUMENTS

| | | | |
|---|---|---|---|
| 7,366,029 B2 | 4/2008 | Kagan | |
| 7,631,245 B2 | 12/2009 | Lasser | |
| 2003/0084220 A1* | 5/2003 | Jones et al. | 710/301 |
| 2007/0118682 A1* | 5/2007 | Zhang et al. | 711/103 |
| 2008/0086631 A1* | 4/2008 | Chow et al. | 713/2 |
| 2008/0177922 A1* | 7/2008 | Chow et al. | 710/302 |
| 2009/0300269 A1* | 12/2009 | Radke et al. | 711/103 |
| 2010/0023800 A1 | 1/2010 | Harari et al. | |
| 2010/0146194 A1* | 6/2010 | Cheng et al. | 711/103 |
| 2011/0040924 A1 | 2/2011 | Selinger | |
| 2011/0041005 A1 | 2/2011 | Selinger | |
| 2011/0041039 A1* | 2/2011 | Harari et al. | 714/773 |
| 2011/0161554 A1 | 6/2011 | Selinger et al. | |
| 2011/0161784 A1 | 6/2011 | Selinger et al. | |
| 2011/0167226 A1* | 7/2011 | Pong | 711/147 |

OTHER PUBLICATIONS

U.S. Appl. No. 13/077,487 entitled, "Multi-Layer Memory System", filed Mar. 31, 2011, 40 pages.

* cited by examiner

*Primary Examiner* — Charles Rones
*Assistant Examiner* — Tian-Pong Chang
(74) *Attorney, Agent, or Firm* — Brinks Gilson & Lione

(57) ABSTRACT

A controller and method for memory aliasing for different flash memory types are presented. In one embodiment, a controller is presented having one or more interfaces through which to communicate with a plurality of memory dies, wherein at least one of the memory dies is of a different memory type than the other memory dies. The controller also has an interface through which to communicate with a host, wherein the interface only supports commands for a single memory types. The controller further contains a processor that is configured to receive a logical address and a command from the host, determine which memory die is associated with the logical address, and translate the command received from the host to a form suitable for the memory type of the memory die associated with the logical address.

16 Claims, 11 Drawing Sheets

| | | Memory organization block |
|---|---|---|
| 80-83 | M | Number of data bytes per page |
| 84-85 | M | Number of spare bytes per page |
| 86-89 | M | Obsolete - Number of data bytes per partial page |
| 90-91 | | Obsolete - Number of spare bytes per partial page |
| 92-95 | M | Number of pages per block |
| 96-99 | M | Number of blocks per logical unit (LUN) |
| 100 | M | Number of logical units (LUNs) |
| 101 | M | Number of address cycles |
| 102 | M | Number of bits per cell |
| 103-104 | M | Bad blocks maximum per LUN |
| 105-106 | M | Block endurance |
| 107 | M | Guaranteed valid blocks at beginning of target |
| 108-109 | M | Block endurance for guaranteed valid blocks |
| 110 | M | Number of programs per page |
| 111 | | Obsolete-Partial programming attributes |
| 112 | M | Number of bits ECC correctability |
| 113 | M | Number of plane address bits |
| 114 | O | Multi-plane operation attributes |
| 115 | O | EZ NAND support |
| 116-127 | O | Reserved (0) |

| | | Electrical parameters block |
|---|---|---|
| 133-134 | M | $t_{PROG}$ Maximum page program time (μs) |
| 135-136 | M | $t_{BERS}$ Maximum block erase time (μs) |
| 137-138 | M | $t_R$ Maximum page read time (μs) |
| 139-140 | M | $t_{CCS}$ Minimum change column setup time (ns) |

| 47 | 43 | 40 39 | 35 | 32 31 | 24 23 | 16 15 | 8 | 0 |
|---|---|---|---|---|---|---|---|---|
| RSV | | LUN Address | | Block Address (2066 blocks/Plane) | Page Address (122 pages/Blocks) | RSV | Col Address (8568 Bytes/Page) - (8192+376) | |
| Row Address | | | | | | | Col Address | |

Address Field Description

| Field | Bits | Description |
|---|---|---|
| Col Address | 13:0 | The Column address. This field addresses each byte within a page. |
| Reserved | 15:14 | Reserved |
| Page Address | 22:16 | The Page address within a block |
| Block Address | 35:24 | The Block address. Indexes the block of the plane. |
| LUN Address | 38:36 | The LUN address. Select the die which is mapped to the targeted LUN. |
| Reserved | 47:39 | Reserved |

FIG. 9

Param 102 - Address Alias Fields

| Flash Bits/cell | Reserved Bits (40:39) | Controller Interpretation/Translation Action |
|---|---|---|
| X1 | 00 | Zero out 2 most significant block address bits, use Binary Programming/Read sequences |
| X2 | 01 | Zero out most significant block address bit, use X2 Programming/Read sequences |
| X3 | 10 | Use all block address bits, use X3 Programming/Read sequences. Due to X3 is not binary scale, not all of the block address bits can be used |
| ND | 11 | Not defined |

FIG. 12

CONTROLLER AND METHOD FOR MEMORY ALIASING FOR DIFFERENT FLASH MEMORY TYPES

BACKGROUND

A solid state drive (SSD) is designed to provide reliable and high performance storage of user data across a flash-based memory system containing a host interface controller (such as a Serial Advanced Technology Attachment (SATA)) interface) and a number of memory multi-chip packages (MCPs), where each MCP contains a stack of NAND flash dies and, optionally, a flash memory controller. The Open NAND Flash Interface (ONFI) protocol provides support for parallel access to multiple NAND dies (or "logical units" (LUNs)) on a single "target" or NAND multi-chip stack on a single shared ONFI channel. In a typical SATA-based SSD application, a central host controller accesses multiple attached devices (targets/NAND device clusters) on each ONFI channel, and across several ONFI channels. (A typical host controller would include a SATA interface and four, eight, or more flash interface channels. These channels may utilize a standard flash interface protocol, such as ONFI.) Each ONFI target typically controls 2, 4, or 8 NAND dies.

Multiple flash technology types (one-, two-, and three-bits per cell, for example) and mixed-technology flash devices (devices with binary regions in an otherwise multi-level cell device) are available; however, some industry standard protocols, such as ONFI, only support commands for a single memory type, as they assume that all the memory devices in an MCP are homogeneous. For example, ONFI interfaces assume that all of the memory devices in the multi-chip package are X1 (one bit per cell), X2 (two bits per cell), or X3 (three bits per cell). However, in some applications, it may be desired to have mixed technology devices (i.e., memory devices of different types) and/or mixed technology targets (i.e., a memory device with different memory types in different address ranges).

SUMMARY

The present invention is defined by the claims, and nothing in this section should be taken as a limitation on those claims.

By way of introduction, the embodiments described below provide a controller and method for memory aliasing for different flash memory types. In one embodiment, a controller is presented having one or more interfaces through which to communicate with a plurality of memory dies, wherein at least one of the memory dies is of a different memory type than the other memory dies. The controller also has an interface through which to communicate with a host, wherein the interface only supports commands for a single memory types. The controller further contains a processor that is configured to receive a logical address and a command from the host, determine which memory die is associated with the logical address, and translate the command received from the host to a form suitable for the memory type of the memory die associated with the logical address.

Other embodiments are disclosed, and each of the embodiments can be used alone or together in combination. The embodiments will now be described with reference to the attached drawings.

BRIEF DESCRIPTION OF THE DRAWINGS

FIG. 7 is a diagram of a parameter page of an embodiment.

FIG. 8 is a diagram of an address mapping scheme of an embodiment

FIG. 9 is a table of address field descriptions of an embodiment

FIG. 12 is a table of address alias fields of an embodiment

DETAILED DESCRIPTION OF THE PRESENTLY PREFERRED EMBODIMENTS

Introduction

The following embodiments relate generally to a controller and method for memory aliasing for different flash memory types. As mentioned above, multiple flash technology types (one-, two-, and three-bits per cell, for example) and mixed-technology flash devices (devices with binary regions in an otherwise multi-level cell device) are available; however, some industry standard protocols, such as ONFI, only support commands for a single memory type, as they assume that all the memory devices in an MCP are homogeneous. For example, ONFI interfaces assume that all of the memory devices in the multi-chip package are X1 (one bit per cell), X2 (two bits per cell), or X3 (three bits per cell). However, in some applications, it may be desired to have mixed technology devices (i.e., memory devices of different types) and/or mixed technology targets (i.e., a memory device with different memory types in different address ranges). The following embodiments can be used to mix different dies inside the same multi-chip package and to use a given memory die in different ways (e.g., to use different commands to talk to X1/X2 memory regions or blocks in order to achieve binary or multi-level cell behavior). In one of the below embodiments, the address bits are used to indicate which kind of memory to use and, optionally, to perform address translation to specific (different) command sequences for the different memory types. (More generally, these embodiments can use address bits for special modes.) Existing host controller ASICs only implement standard commands with a variable length address field. While there are parameter pages in ONFI, for example, to specify the number of address bytes, other information may not be able to be expressed or indicated.

Before turning to details of these embodiments, the following section discusses exemplary architectures.

Exemplary Architectures

Figure 1:
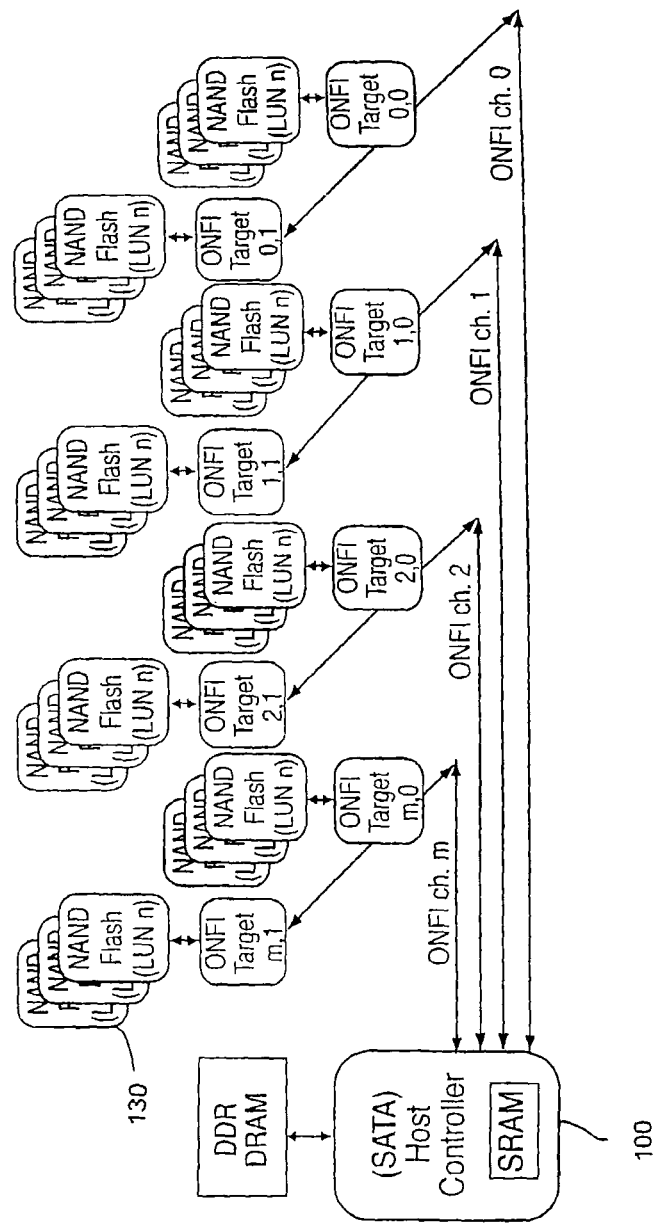
FIG. 1 is a block diagram of a memory system of an embodiment.

Turning now to the drawings, FIG. 1 is a block diagram of a memory system of an embodiment. As shown in FIG. 1, a host controller 100 is in communication with a plurality of multi-chip memory packages via one or more interfaces (here, ONFI channels). (As used herein, the phrase "in communication with" means directly in communication with or indirectly in communication with through one or more components, which may or may not be shown or described herein.) Here, the controller 100 accesses (on each ONFI channel and across several ONFI channels) multiple attached ONFI targets. Each multi-chip memory package (called a "target" in FIG. 1) comprises a plurality of memory dies (NAND Flash LUNs) and, optionally, a local MCP controller (not shown). The controller 100 also has a processor configured to perform various actions, which will be described in detail below. The controller 100 can have on-board memory (e.g., SRAM) and/or external memory (e.g., DDR DRAM) to store executable program code (software or firmware) and other user data and system control data or structures used in its operations. In one embodiment, the memory system is part of a solid-state drive (SSD), and, in another embodiment, the controller 100 is used in OEM designs that use a Southbridge controller to interface to flash memory devices. Of course, these are merely examples, and other implementations can be used.

As mentioned above, controller 100 is a host controller. A "host" is any entity that is capable of accessing the one or more flash memory device(s) through the controller 100, either directly or indirectly through one or more components named or unnamed herein. A host can take any suitable form, such as, but not limited to, a personal computer, a mobile phone, a game device, a personal digital assistant (PDA), an email/text messaging device, a digital camera, a digital media (e.g., MP3) player, a GPS navigation device, a personal navigation system (PND), a mobile Internet device (MID), and a TV system. Depending on the application, the host can take the form of a hardware device, a software application, or a combination of hardware and software.

Also, "flash memory device(s)" refer to device(s) containing a plurality of flash memory cells and any necessary control circuitry for storing data within the flash memory cells. In one embodiment, the flash memory cells are NAND memory cells, although other memory technologies, such as passive element arrays, including one-time programmable memory elements and/or rewritable memory elements, can be used. (It should be noted that, in these embodiments, a non-NAND-type flash memory device can still use a NAND interface and/or NAND commands and protocols.) Also, a flash memory device can be a single memory die or multiple memory dies. Accordingly, the phrase "a flash memory device" used in the claims can refer to only one flash memory device or more than one flash memory device.

Figure 2:
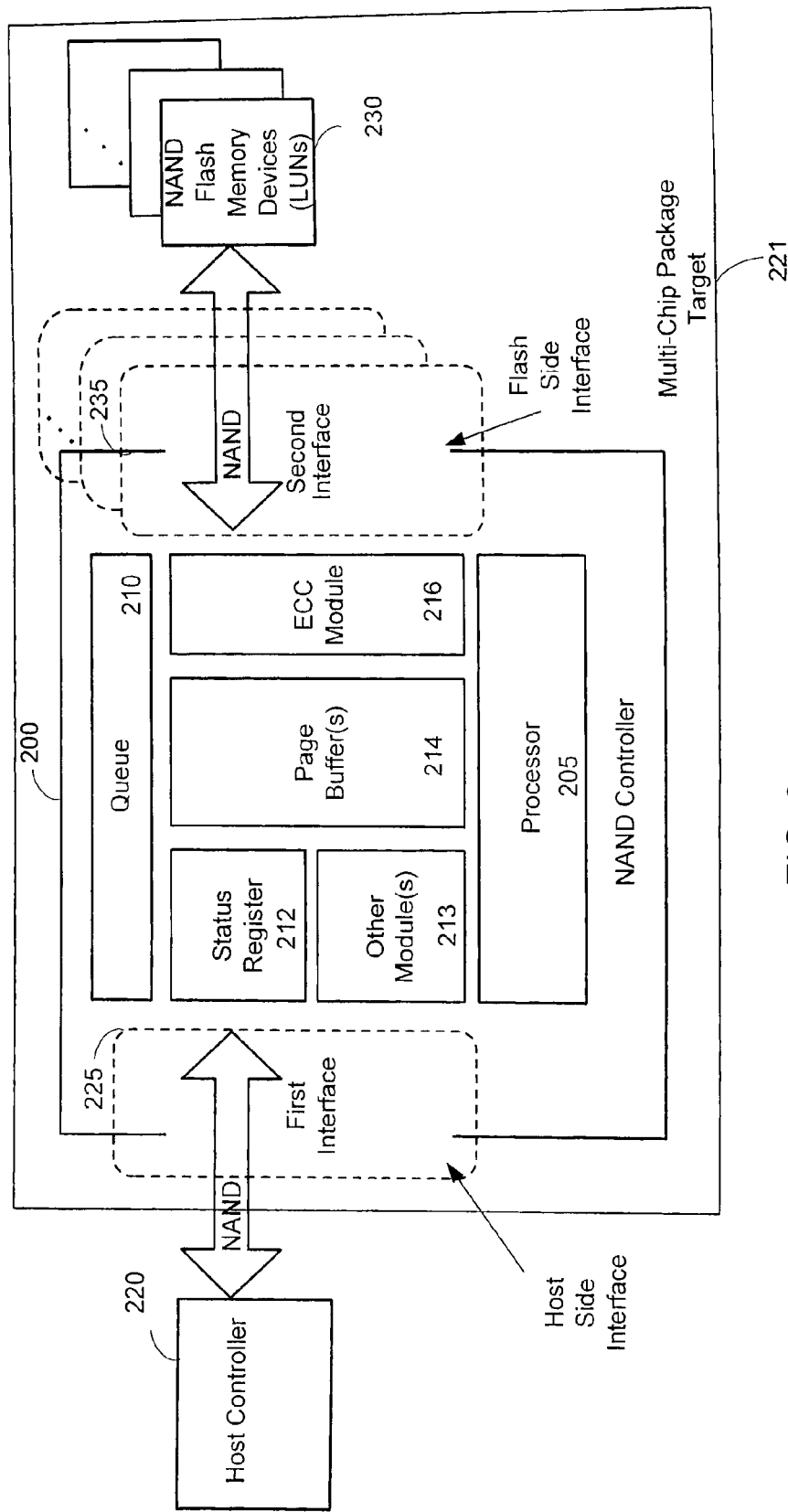
FIG. 2 is a block diagram of a multi-chip package of an embodiment.

Returning to the drawings, FIG. 2 illustrates a "target" multi-chip package 221 and a host controller 220 of an embodiment. As shown in FIG. 2, the multi-chip package 221 has a NAND controller 200 having a processor 205, a queue (memory) 210, one or more status registers 212, one or more other module(s) 213, one or more page buffers 214, and an error correction code (ECC) module 216. (The NAND controller 200 can contain other components, which are not shown in FIG. 2 to simplify the drawing.) As used herein, a "module" can include hardware, software, firmware, or any combination thereof. Examples of forms that a "module" can take include, but are not limited to, one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. The "other module(s) 213" can perform any desired function(s), such as, but not limited to, data scrambling, column replacement, handling write aborts and/ or program failures (via safe zones), read scrubbing, wear leveling, bad block and/or spare block management, error detection code (EDC) functionality, status functionality, encryption functionality, error recovery, and address mapping (e.g., mapping of logical to physical blocks). Further information about these various functions is described in U.S. patent application Ser. Nos. 12/539,394; 12/539,407; 12/539, 379; 12/650,263; 12/650,255; and 12/539,417, which are hereby incorporated by reference.

While the NAND controller 200 and flash memory device (s) 230 are shown as two separate boxes, it should be understood that the NAND controller 200 and flash memory device (s) 230 can be arranged in any suitable manner (e.g., packaged in different packages, packaged within a common multi-chip package, and or integrated on a same die). In any of these arrangements, the controller can be physically located separately from the host controller 220. This allows the controller and flash memory device(s) to be considered a separate circuitry unit, which can be used with a wide variety of host controllers 220.

The NAND controller 200 communicates with the host controller 220 using a first interface 225 and communicates with the flash memory device(s) 230 using second interface (s) 235. The first and second interfaces can be NAND interfaces operating under NAND interface protocols. Examples of NAND interfaces include, but are not limited to, Open NAND Flash Interface (ONFI), toggle mode (TM), and a high-performance flash memory interface, such as the one described in U.S. Pat. No. 7,366,029, which is hereby incorporated by reference. The NAND controller 200 may optionally include one or more additional host-side interfaces, for interfacing the NAND controller 200 to hosts using non-NAND interfaces, such as SD, USB, SATA, or MMC interfaces. Also, the interfaces 225, 235 can use the same or different NAND interface protocols.

In general, a NAND interface protocol is used to coordinate commands and data transfers between a NAND flash device and a host using, for example, data lines and control signals, such as ALE (Address Latch Enable), CLE (Command Latch Enable), and WE# (Write Enable). Even though the term "NAND interface protocol" has not, to date, been formally standardized by a standardization body, the manufacturers of NAND flash devices all follow very similar protocols for supporting the basic subset of NAND flash functionality. This is done so that customers using NAND devices within their electronic products could use NAND devices from any manufacturer without having to tailor their hardware or software for operating with the devices of a specific vendor. It is noted that even NAND vendors that provide extra functionality beyond this basic subset of functionality ensure that the basic functionality is provided in order to provide compatibility with the protocol used by the other vendors, at least to some extent.

A given device (e.g., a controller, a flash memory device, a host, etc.) is said to comprise, include, or have a "NAND interface" if the given device includes elements (e.g., hardware, software, firmware, or any combination thereof) necessary for supporting the NAND interface protocol (e.g., for interacting with another device using a NAND interface protocol). (As used herein, the term "interface(s)" can refer to a single interface or multiple interfaces. Accordingly, the term "interface" in the claims can refer to only one interface or more than one interface.) In this application, the term "NAND Interface protocol" (or "NAND interface" in short) refers to an interface protocol between an initiating device and a responding device that, in general, follows the protocol between a host and a NAND flash device for the basic read, write, and erase operations, even if it is not fully compatible with all timing parameters, not fully compatible with respect to other commands supported by NAND devices, or contains additional commands not supported by NAND devices. One suitable example of a NAND interface protocol is an interface protocol that uses sequences of transferred bytes equivalent in functionality to the sequences of bytes used when interfacing with a Toshiba TC58NVG1S3B NAND device (or a Toshiba TC58NVG2D4B NAND device) for reading (opcode 00H), writing (opcode 80H), and erasing (opcode 60H), and also uses control signals equivalent in functionality to the CLE, ALE, CE, WE, and RE signals of the above NAND device.

It is noted that a NAND interface protocol is not symmetric in that the host—not the flash device—initiates the interaction over a NAND interface. Further, an interface (e.g., a NAND interface or an interface associated with another protocol) of a given device (e.g., a controller) may be a "host-side interface" (e.g., the given device is adapted to interact with a host using the host-side interface), or the interface of the given device may be a "flash memory device-side interface" (e.g., the given device is adapted to interact with a flash memory device using the flash memory device-side interface). The terms "flash memory device-side interface," "flash device-side interface," and "flash-side interface" are used interchangeably herein.

These terms (i.e., "host-side interface" and "flash device-side interface") should not be confused with the terms "host-type interface" and "flash-type interface," which are terminology used herein to differentiate between the two sides of a NAND interface protocol, as this protocol is not symmetric. Furthermore, because it is the host that initiates the interaction, we note that a given device is said to have a "host-type interface" if the device includes the necessary hardware and/or software for implementing the host side of the NAND interface protocol (i.e., for presenting a NAND host and initiating the NAND protocol interaction). Similarly, because the flash device does not initiate the interaction, we note that a given device is said to have a "flash-type interface" if the device includes the necessary hardware and/or software for implementing the flash side of the NAND protocol (i.e., for presenting a NAND flash device).

Typically, "host-type interfaces" (i.e., those which play the role of the host) are "flash device-side interfaces" (i.e., they interact with flash devices or with hardware emulating a flash device) while "flash device-type interfaces" (i.e., those which play the role of the flash device) are typically "host-side interfaces" (i.e., they interact with hosts or with hardware emulating a host).

Additional information about exemplary controllers (and their advantages over prior controllers) can be found in U.S. Pat. No. 7,631,245 and U.S. patent application Ser. Nos. 12/539,394; 12/539,407; 12/539,379; 12/650,263; 12/650,255; and 12/539,417, which are hereby incorporated by reference.

Figure 3:
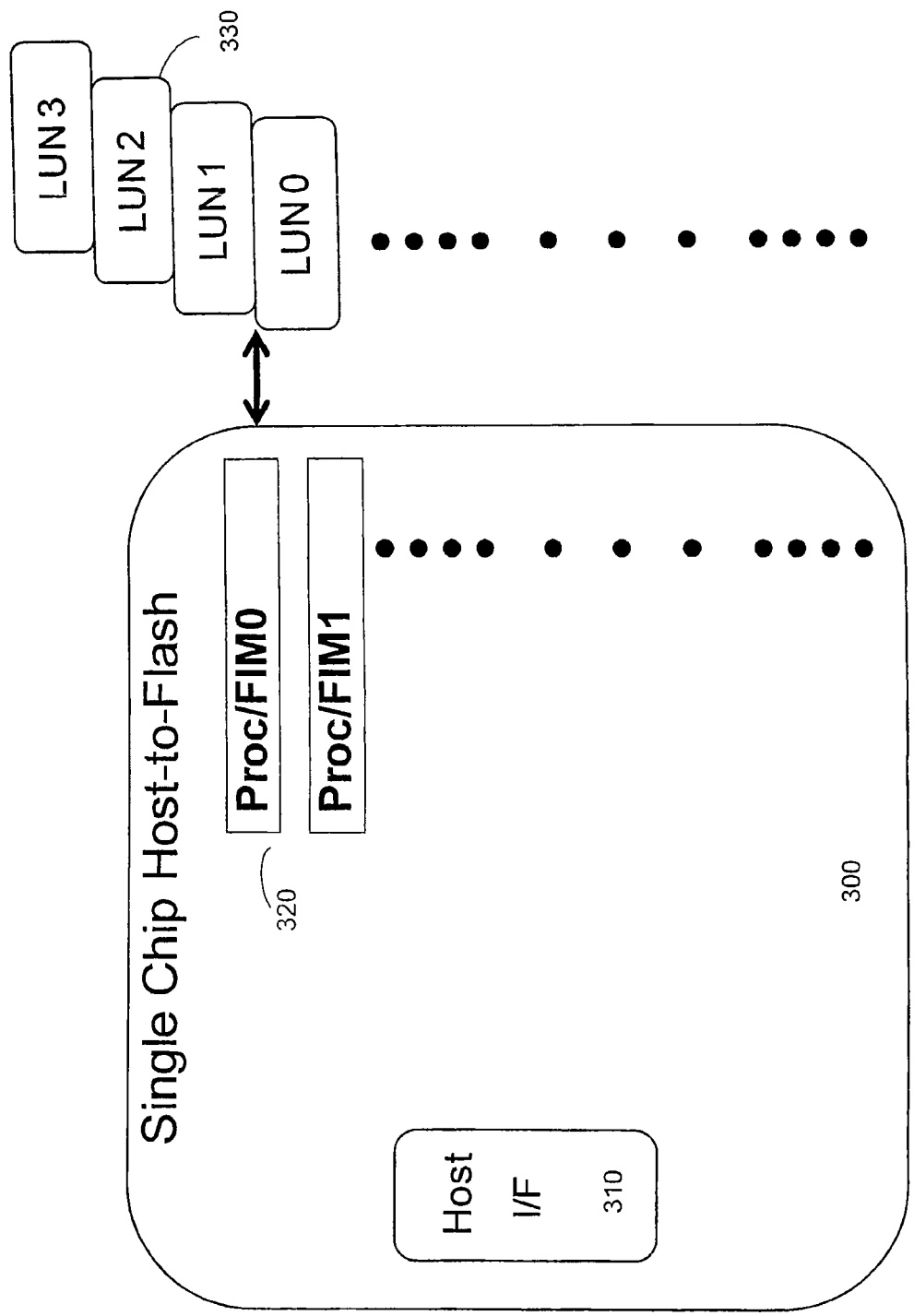
FIG. 3 is a block diagram of an architecture of an embodiment.
Figure 4:
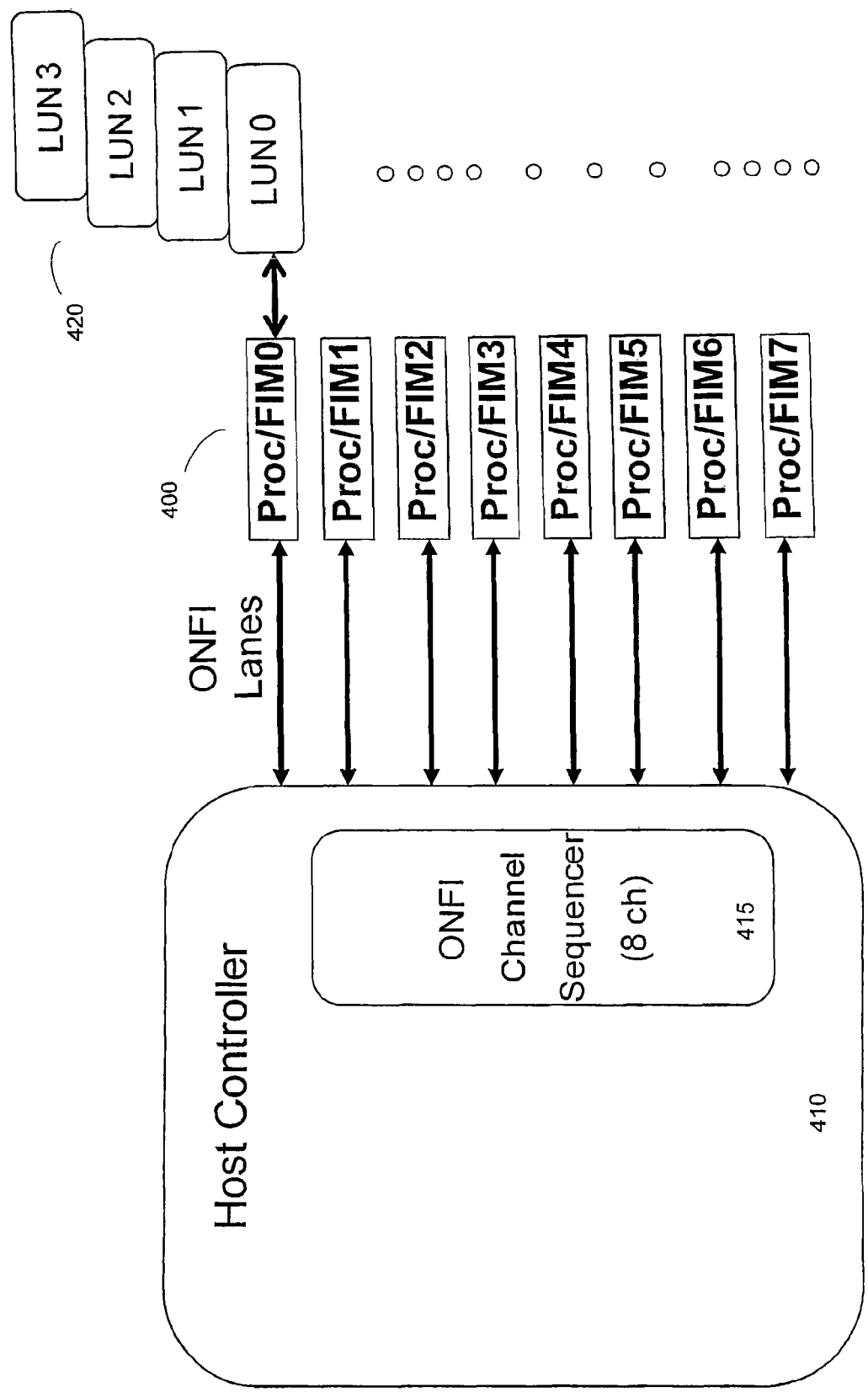
FIG. 4 is a block diagram of an architecture of an embodiment.
Figure 5:
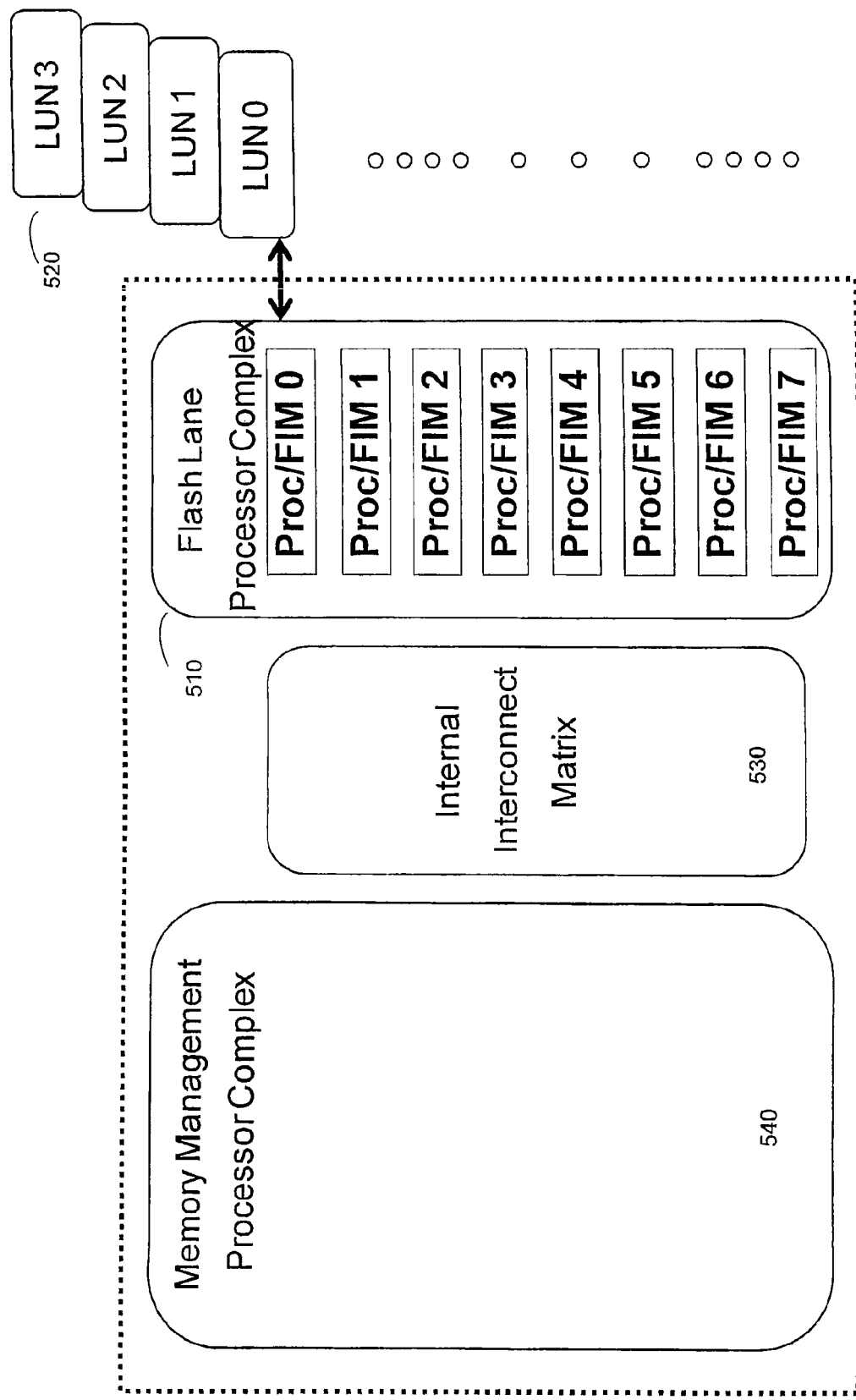
FIG. 5 is a block diagram of an architecture of an embodiment.

It should also be noted that other controller architectures can be used. For example, FIG. 3 illustrates a single chip host-to-flash controller 300. This controller 300 contains a host interface 310 and a plurality of processor/flash interface modules (FIMs) 320. Each of the processor/FIMs is connected to a respective plurality of flash memory devices (LUNs). In another embodiment (shown in FIG. 4), instead of the plurality of processor/FIMs being inside a single controller, each processor/FIM 400 communicates individually with an ONFI channel sequencer 415 in the host controller via respective ONFI lanes. As in FIG. 3, each processor/FIM 400 in this embodiment is connected to a plurality of flash memory devices (LUNs) 420. In yet another embodiment (shown in FIG. 5), the controller contains a flash lane processor complex 510 that contains a plurality of processor/FIMs connected to a plurality of flash memory devices (LUNs) 520. The flash lane processor complex 525 is connected via an internal interconnect matrix 530 to a memory management processor complex 540, that manages the operation of the memory. Of course, these are just examples of some of the architectures that can be used; others can be used. The claims should not be limited to a particular type of architecture unless explicitly recited therein.

The three example architectures above illustrate the variations on how a host platform (PC, laptop, etc.), host interface controller (such as SATA, PCIe, etc.), or simply one or more host processes or execution threads within an integrated storage complex or SOC may produce a plurality of memory storage, memory management, or device maintenance or health operations destined for one or more exemplary Flash Memory controller Lanes, processes, or execution threads.

Now that exemplary controller architectures have been described, the following section provides more information about the embodiments related to memory aliasing for different flash memory types.

Embodiments Relating to Memory Aliasing for Different Memory Types

As mentioned above, in some situations, multiple flash technology types (one-, two-, and three-bits per cell, for example) and mixed-technology flash devices (devices with binary regions in an otherwise multi-level cell device) are available; however, some industry standard protocols, such as ONFI, only support commands for a single memory type, as they assume that all the memory devices in an MCP are homogeneous. For example, ONFI interfaces assume that all of the memory devices in the multi-chip package are X1 (one bit per cell), X2 (two bits per cell), or X3 (three bits per cell). However, in some applications, it may be desired to have mixed technology devices (i.e., memory devices of different types) and/or mixed technology targets (i.e., a memory device with different memory types in different address ranges). The following embodiments can be used to mix different dies inside the same multi-chip package and to use a given memory die in different ways (e.g., to use different commands to talk to X1/X2 memories in order to achieve binary or multi-level cell behavior.

Since the ONFI host interface does not currently have different commands for different memory types, the same effect can be achieved in these embodiments by "aliasing" the memory addresses. In other words, these embodiments use one or more high order bit (or bits) to remap the virtual memory (used by the host interface to the controller) to the specific type of underlying memory and its specific commands. For example, if there are 2K physical blocks in a standard memory device, the block numbers typically occupy 11 bits, or addresses, between 0x0-0x07FF in hex. So, the blocks can be mapped as follows: 0x0-0x07FF to X2 memory and 0x1000-0x13FF or 0x1000-0x17FF (even addresses only) to X1 memory (note that there are only half as many blocks in X1 as in X2). A variation of this approach is to designate a "fencepost" as the boundary between a first region and a second region. As per the above example, the fencepost could be set as "0x1000". This would be understood between the host and the controller to be the boundary between X2 and X1 memory. Commands addressed by the host to a memory region below this fencepost (<0x1000) would be interpreted by the controller as accesses to X2 memory, while commands directed to a region above the fencepost (=/>0x1000) would be interpreted by the controller as accesses to X1 memory.

There are several advantages associated with these embodiments. For example, these embodiments allow a host controller to request MLC(X2) or binary mode (X1) access over a conventional NAND interface using a single set of read and program commands without requiring vendor unique commands. There are various ways of identifying the different memory capacities or capabilities of the two (or more) regions. First, existing vendor unique fields in the ONFI parameter page can be utilized to convey additional parameters associated with a second (or more) memory region(s). (While one a single standard ONFI parameter page can be specified, a compound parameter page can be used.) Second, additional parameter pages (or additional sub-sections of the main parameter page) can be used to provide for ONFI "compound targets."

Figure 6:
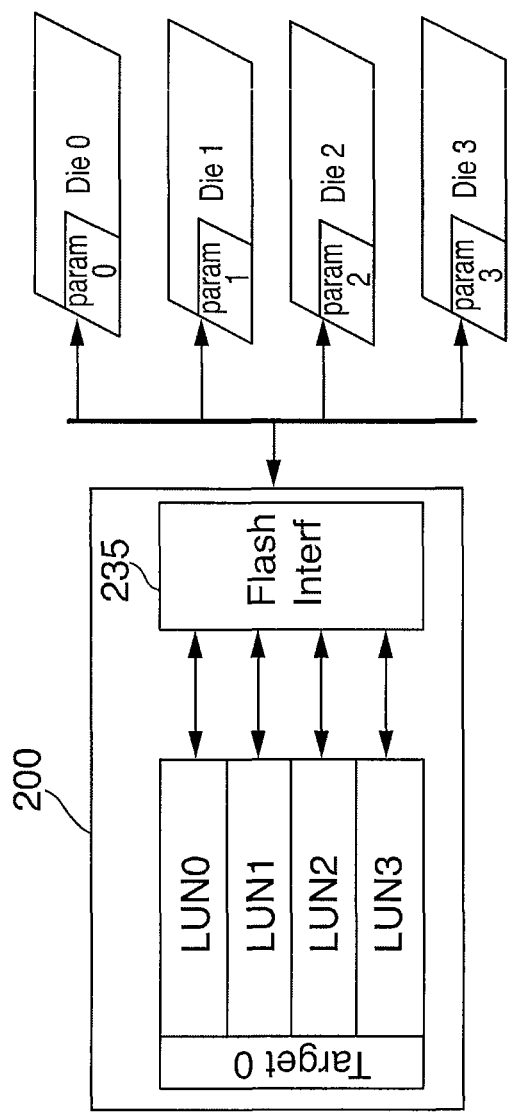
FIG. 6 is a block diagram of a four-die, four-LUN configuration of an embodiment.

As discussed above in conjunction with FIG. 2, the controller 200 in a multi-chip package target 221 maps each LUN to a different die or multiple dies. FIG. 6 illustrates diagrammatically a four die (Die0 to Die3), four LUN (LUN0 to LUN 3) configuration of an embodiment. Multiple flash technology types (one-, two-, and three-bits per cell, for example) and mixed-technology flash devices (X2/MLC/two-bits per cell with binary X1 region, and X3/3 bits per cell with binary X1 region) have been produced for the last two flash generations and are likely to be continued for future generations. However, as mentioned above, the industry standard ONFI protocol only provides for a single parameter page structure per multi-chip package target, which suggests a single, homogenous flash device type for all attached LUNs (dies). This is likely to be a common target configuration (all LUNs/dies of the same type); however, it is expected that the optimized usage of mixed-technology targets in some product applications can provide both better cost-performance and better product endurance.

To help illustrate the limitations of the ONFI protocol, reference is now made to FIG. 7, which is a diagram of a legacy ONFI parameter page. In this diagram, "M" refers to a mandatory parameter, and "O" refers to an optional parameter. As shown in FIG. 7, several device-type specific parameters (highlighted) are reported in the ONFI Parameter Page. For example, the standard allows a single set of values to be specified per target in the memory organization block and the electrical parameters block. A specific set of parameters and timings would be specified if the attached flash devices were made up of MLC/two-bits per cell, while a very different set of parameters and timings would be specified if the devices were three-bits bits per cell. With only a single parameter page, an ONFI host would expect to access all devices on this target, and all internal regions of each device according to the same structure and timing. For the simple case of MLC/X2 with a binary/X1 region, the ONFI standard does not provide for two (or more) sets of parameters in this target. It is expected that current systems addressing mixed ONFI targets do so with the host application utilizing "outside knowledge" of the ONFI devices' multiple parameter sets, rather than being able to read and act upon specifically-provided values in the ONFI parameter page (only one set is there).

The ONFI standard does, however, allow for multiple targets per ONFI channel. So, one way of utilizing both an MLC memory device, or memory region, along with a binary device, or binary memory region, on the same ONFI channel would be to address these two types of flash with two different CE_n's (Chip_Enables), one CE_n for the MLC, and a second CE_n for the binary. In this case, these would be regarded by the host as two separate targets, each with its own parameter page. With this arrangement, the host would manage when to send certain data only to X1 targets and when to send certain other data only to MLC targets. There are a few disadvantages to this approach. First, it requires an extra CE_n pin for a single flash device/package that has both types of memory. Second, it may require extra decoding logic if a single NAND flash device supports configured regions in the same device (X3 device with binary/X1 region).

Ultimately, there is a need to extend the ONFI parameter page structure to allow for more than just a single set of technology-dependent parameters (for mixed device-type/technology) implementations. Given mixed-technology devices and/or mixed-technology targets, there is also a need to address these multiple regions in a protocol-compatible scheme, to enable using standard off-the shelf ONFI host controllers (using vendor-specific command extensions may incur performance penalty). With the proposed definition of a compound target parameter page structure, the device-type specific parameters of each die can be reported to the host. Each LUN would have a parameter page (or sub-page) to describe its characteristics. As the host issues commands to the compound target, the LUN address received from the host will be translated into a die index to address the NAND devices through the flash interface. While the host is issuing uniform (regardless of memory region) erase, program, and read commands, the controller will translate or use the appropriate technology-specific flash commands and command timings per each NAND die or LUN. The translation or "special handling" will be transparent to the host, though the host will have knowledge of the memory organization and electrical timing parameters of the multiple regions, as provided in the proposed compound target parameter page.

Figure 11:
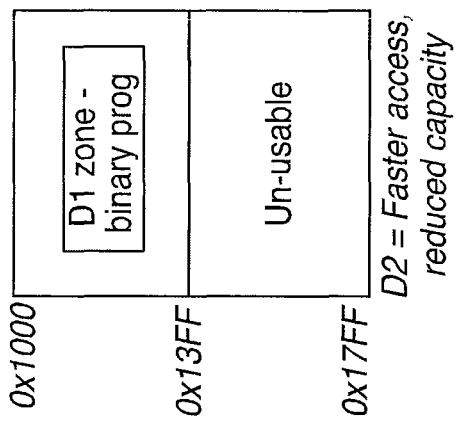
FIG. 11 is a diagram of different zones of an address range of an embodiment.
Figure 10:
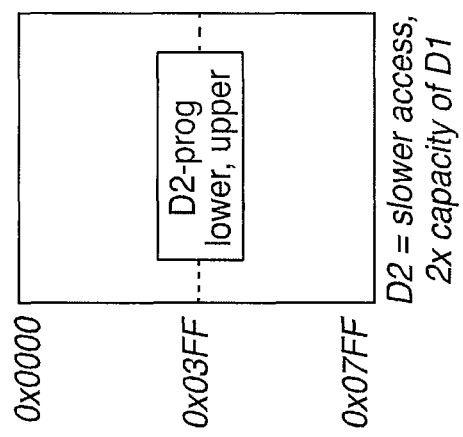
FIG. 10 is a diagram of different zones of an address range of an embodiment.

FIGS. 8-11 will now be discussed as an example of how these embodiments can be used with NAND flash address mapping. The address mapping example shown here is based on 32 nm X2 technology. For other NAND technologies, the address bit map might be different and can be provided in the parameter page. As shown in these figures, bits 0-13 provide a column address field, which addresses each byte within a page. Bits 16-22 are for a page address within a block, and bits 24-35 are for a block address, which indexes the block of a plane. Bits 36-38 are for the LUN address, which selects the die which is mapped to a targeted LUN. Bits 14-15 and 49-47 are reserved. FIGS. 10 and 11 are sub-windows of X2 and X1 zones within a total ONFI address range for LUN(n). In this embodiment, the multi-chip package target can provide ONFI 2.2 interface compatible access to binary and MLC memories. That is, when an MCP NAND die/LUN supports only a single bit/cell capability (X1, X2, or X3), then the standard ONFI specification can be utilized, with the bits/cell spec in parameter Byte 102 of the ONFI parameter page. However, to enable ONFI-compatible access of mixed NAND die/LUNs, such as X2 w/X1 Binary cache, or X3 w/X1 Binary cache), an extension approach may be utilized. One approach employs some of the extra (reserved) high-order address bits, (40:39) for example, to encode the bits/cell indicator as part of an address aliasing scheme.

FIG. 12 specifies how X1, X2, and X3 memory types might be specified. In this embodiment, the host first reads the parameter page from each LUN/die in the MCP (bytes 0-255). Parameter 102 specifies the maximum bits/cell supported by LUN/die (here, X1/X2/X3 memory type). Next, the vendor-specific byte 166 is checked to determine if single memory technology or hybrid memory technology is being used. If hybrid memory technology is being used, the LUN/die has hybrid (mixed X1/X2/X3) capable, and the controller checks the additional vendor-specific bytes (166-253) for region(s) that support higher performance at the cost of reduced capacity. These bytes specify region start address, end address, and region capacity. (In some instances, the address may need to be converted to, for example, even addresses (e.g., shift address one bit left).) Next (and if single technology is being used), the host issues an ONFI read or program command—Reserved Addr(40:39) set accordingly to bits/cell mode per FIG. 12. The controller then decodes Addr(40:39) for bits/cell memory access type mode per FIG. 12. The controller's firmware then clears the three-bits/cell) MS bits of block address portion and issues an NAND program or read sequence required by bits/cell technology. Finally, the host read or program NAND command completes with correct data/result.

Figure 13:
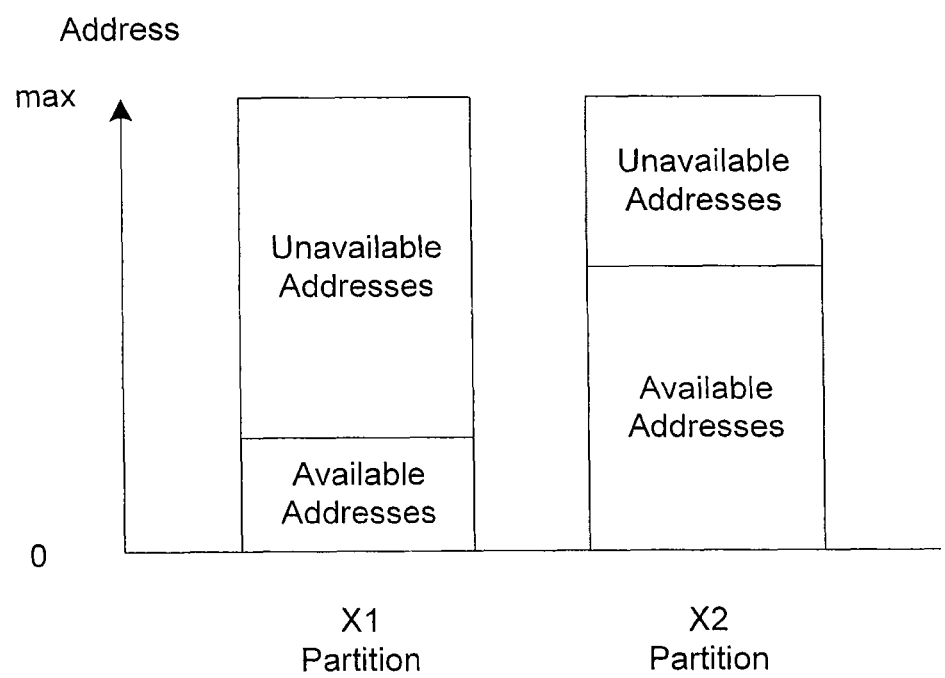
FIG. 13 is an illustration of an address partition scheme within a LUN/die of an embodiment.

There are several alternatives that can be used with these embodiments. First, as mentioned above, a "fencepost" can be designated as the boundary between a first region and a second region, where commands addressed by the host to a memory region below the fencepost would be interpreted by the controller as accesses to one memory type, while commands directed to a region above the fencepost would be interpreted by the controller as accesses to another memory type. This fencepost concept can be extended to multiple partitions on the same memory die, as illustrated in FIG. 13. FIG. 13 shows two partitions of different memory types (X1 and X2), where the fencepost is set at a different address for each of the partitions. Addresses above the fencepost are unavailable, while addresses below the fencepost are available.

Conclusion

It is intended that the foregoing detailed description be understood as an illustration of selected forms that the invention can take and not as a definition of the invention. It is only the following claims, including all equivalents that are intended to define the scope of this invention. Also, some of the following claims may state that a component is operative to perform a certain function or configured for a certain task. It should be noted that these are not restrictive limitations. It should also be noted that the acts recited in the claims can be performed in any order—not necessarily in the order in which they are recited.

What is claimed is:

1. A controller comprising:
   one or more interfaces to a plurality of memory dies, wherein at least one of the memory dies stores X number of bits per memory cell, whereas the other memory dies store Y number of bits per memory cell;
   an interface to a host, wherein the interface supports commands for storing Y number of bits per memory cell, wherein the interface operates according to a protocol that defines an address field, wherein a first set of bits in the address field are designated for an address and a second set of bits are designated as reserved; and
   a processor in communication with the one or more interfaces, wherein the processor is configured to:
      receive an address and a command from the host, wherein the address is located in the first set of bits of the address field;
      read data from the second set of bits, wherein the data read from the second set of bits specifies X number of bits per memory cell even though the interface supports commands for storing Y number of bits per memory cell; and
      perform the command on the memory die specified by the address using X number of bits per memory cell even though the interface supports commands for storing Y number of bits per memory cell.

2. The controller of claim 1, wherein the at least one of the memory dies is able to store a different number of bits-per-cell in different regions of the die, whereas the other memory dies are homogeneous.

3. The controller of claim 1, wherein the address is a logical address, and wherein the processor is configured to compare the logical address to a fencepost indicating available and unavailable addresses in different memory type partitions of a memory die.

4. The controller of claim 1, wherein each memory die stores at least one parameter page which specifies the operational parameters its memory type(s), and wherein the processor is further operative to read the parameter page from each memory die.

5. The controller of claim 1, wherein the controller is part of a solid-state drive.

6. The controller of claim 1, wherein the interface to the host is a flash interface.

7. The controller of claim 6, wherein the flash interface is an Open NAND Flash Interface (ONFI) interface.

8. The controller of claim 6, wherein the flash interface is a Toggle Mode interface.

9. A method for memory aliasing for different flash memory types, the method comprising:
   performing in a controller comprising one or more interfaces to a plurality of memory dies and an interface to a host, wherein at least one of the memory dies stores X number of bits per memory cell, whereas the other memory dies store Y number of bits per memory cell, and wherein the interface to the host only supports commands storing Y number of bits per memory cell and operates according to a protocol that defines an address field, wherein a first set of bits in the address field are designated for an address and a second set of bits are designated as reserved:
      receiving an address and a command from the host, wherein the address is located in the first set of bits of the address field;
      reading data from the second set of bits, wherein the data read from the second set of bits specifies X number of bits per memory cell even though the interface supports commands for storing Y number of bits per memory cell; and
      performing the command on the memory die specified by the address using X number of bits per memory cell even though the interface supports commands for storing Y number of bits per memory cell.

10. The method of claim 9, wherein the at least one of the memory dies is able to store a different number of bits-per-cell in different regions of the die, whereas the other memory dies are homogeneous.

11. The method of claim 9, wherein the address is a logical address, and wherein the method further comprises comparing the logical address to a fencepost indicating available and unavailable addresses in different memory type partitions of a memory die.

12. The method of claim 9, wherein each memory die stores at least one parameter page which specifies the operational parameters its memory type(s), and wherein the method further comprises reading the parameter page from each memory die.

13. The method of claim 9, wherein the controller is part of a solid-state drive.

14. The method of claim 9, wherein the interface to the host is a flash interface.

15. The method of claim 14, wherein the flash interface is an Open NAND Flash Interface (ONFI) interface.

16. The method of claim 14, wherein the flash interface is a Toggle Mode interface.

* * * * *